United States Patent [19]

Strosser et al.

[11] Patent Number: 4,818,980
[45] Date of Patent: Apr. 4, 1989

[54] OPERATOR CONTROL PANEL

[75] Inventors: Richard P. Strosser, Akron; Stuart O. Swiler, New Holland; Marvin G. Weaver, Jr., Lititz, all of Pa.

[73] Assignee: Ford New Holland, Inc., New Holland, Pa.

[21] Appl. No.: 63,389

[22] Filed: Jun. 18, 1987

[51] Int. Cl.$^4$ .............................................. G09G 3/36
[52] U.S. Cl. .................. 340/784; 340/815.15
[58] Field of Search ............... 340/815.17, 815.07, 340/815.15, 815.16, 815.18, 815.19, 815.2, 718, 765, 760, 784; 362/28, 29, 30, 31, 85, 296, 297, 310, 329, 346; 350/337, 338, 339 R, 345

[56] References Cited

U.S. PATENT DOCUMENTS

| | | | |
|---|---|---|---|
| 4,017,155 | 4/1977 | Yagi et al. | 350/345 |
| 4,171,874 | 10/1979 | Bigelow et al. | 350/345 |
| 4,367,467 | 1/1983 | Emile, Jr. | 340/815.07 |
| 4,431,966 | 2/1984 | Pucciarello | 362/29 |
| 4,453,200 | 6/1984 | Trcka et al. | 362/29 |
| 4,618,216 | 10/1986 | Suzawa | 350/345 |
| 4,642,627 | 2/1987 | Hodsdon | 340/765 |
| 4,649,381 | 3/1987 | Masuda et al. | 340/784 |
| 4,684,939 | 8/1987 | Streit | 340/765 |
| 4,754,275 | 6/1988 | Abbaticchio et al. | 340/765 |

Primary Examiner—Gerald L. Brigance
Assistant Examiner—Richard Hjerre
Attorney, Agent, or Firm—Darrell F. Marquette; Frank A. Seemar; Larry W. Miller

[57] ABSTRACT

In one embodiment, an operator control panel includes an enclosure in which a liquid crystal display and a pair of lamps are disposed. A first reflective surface is located inside the enclosure, and a second reflective surface is located outside the enclosure. The lamps are positioned so that light rays from their filaments are projected rearwardly onto the first reflective surface and then forwardly onto the back of the liquid crystal display while other light rays from the lamp filaments are projected forwardly onto the second reflective surface and then downwardly onto the front of the control panel. In another embodiment of the operator control panel, the lamps are disposed outside the enclosure and the second reflective surface is omitted.

11 Claims, 2 Drawing Sheets

OPERATOR CONTROL PANEL

BACKGROUND AND SUMMARY OF THE INVENTION

This invention relates generally to operator control panels which are illuminated.

Operator control panels such as the type used with the New Holland Model 2000 baler include membrane switches for remotely controlling various functions of the baler and liquid crystal displays for displaying important baling information. The membrane switches and the liquid crystal displays have been illuminated from behind, i.e., backlit, by an internal light source housed within the control panel. Backlighting of membrane switches in this manner is undesirable because the legends on the faces of the switches are very difficult to read in the dark. This is due to the fact that the grids inside the switches block some of the light emitted by the internal light source and thereby prevent adequate illumination of the switch legends. Also, backlighting of liquid crystal displays may be undesirable because it produces "hot spots" on the displays if the light source is directly behind the displays.

One possible solution to the aforementioned problem is the use of an additional external light source to illuminate the front of the operator panel. However, this is not desirable since two separate light sources (one internal and one external) would then be required thereby increasing the cost and complexity of the operator panel.

In one embodiment, the present invention provides an operator control panel including an enclosure defined by a back wall, side walls, a top wall, a bottom wall, and a front panel. Display means disposed inside the enclosure is viewable through a window in the front panel, and lamp means is also disposed inside the enclosure. First reflective means is located inside the enclosure, and second reflective means is located outside the enclosure. The lamp means is positioned so that light rays therefrom are projected onto the first reflective surface and then onto the display means while other light rays from the lamp means are projected onto the second reflective means and then onto the front panel. Preferably the first reflective means comprises a first reflective surface on the back wall of the enclosure, and the second reflective means comprises a second reflective surface on a forward extension of the top wall of the enclosure. The display means preferably comprises a liquid crystal display positioned such that the first-mentioned light rays are projected onto the back thereof.

In another embodiment of the present invention, the lamp means is disposed outside the enclosure of the operator control panel and the second reflective means is omitted. The lamp means is positioned so that light rays therefrom are projected onto reflective means located inside the enclosure and then onto the display means while other light rays from the lamp means are projected onto the front panel.

DESCRIPTION OF THE PREFERRED EMBODIMENT

Figure 1:
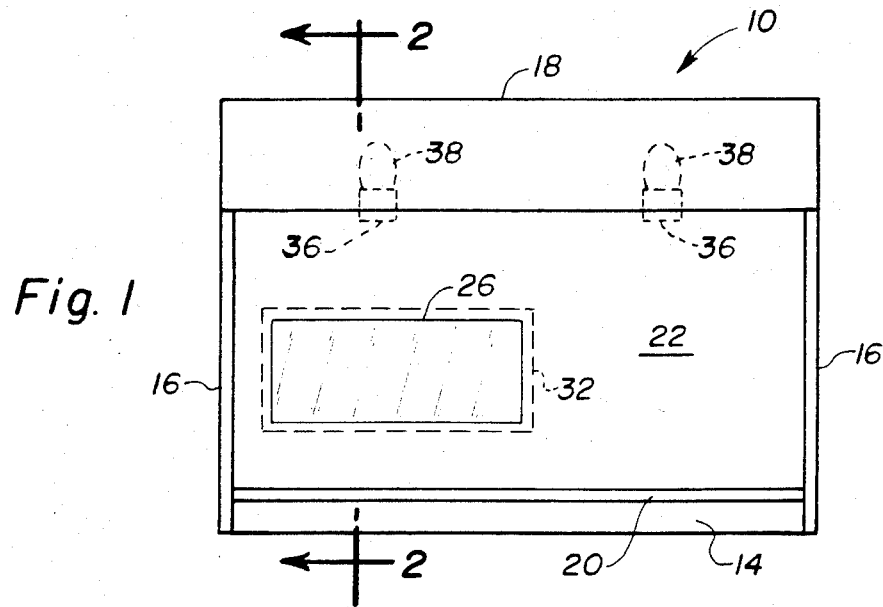
FIG. 1 is a front elevational view of a control panel embodying one embodiment of the present invention.
Figure 2:
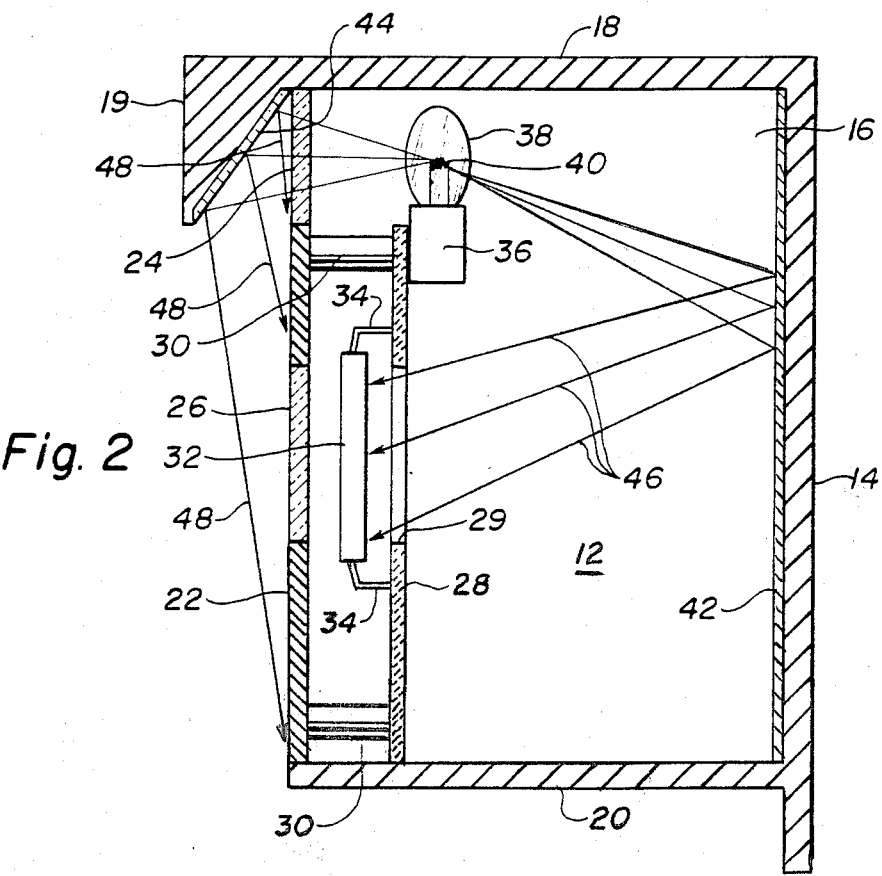
FIG. 2 is an enlarged cross-sectional view taken along lines 2—2 in FIG. 1.

Referring to FIGS. 1 and 2, an operator control panel according to one embodiment of the present invention includes an enclosure 12 formed by a back wall 14, sidewalls 16, a top wall 18, a bottom wall 20 and a front panel 22. The front panel 22 has a clear window 24, formed of plastic or glass, extending substantially the full width at the top thereof and another clear window 26, also formed of plastic or glass, below the window 24.

A printed circuit board 28 is supported from the front panel 22 inside the enclosure 12 by a series of support posts 30 which extend between the circuit board 28 and the front panel 22. A liquid crystal display 32 of either the transflective type or the transmissive type is supported by and electrically connected to the circuit board 28 by electrical wiring 34. The liquid crystal display 32 is positioned inside the enclosure 12 so that it may be viewed through the window 26. The circuit board 28 has an opening 29 formed therein which is of approximately the same dimensions as the window 26. A pair of standard lamp sockets 36 are mounted inside the enclosure 12 on the circuit board 28 and are electrically connected thereto. A pair of conventional incandescent lamps 38 with filaments 40 are disposed in the sockets 36. Alternatively, other types of lamps without filaments, such as fluorescent or solid state lamps may be used.

In accordance with the embodiment of the present invention shown in FIGS. 1 and 2, a reflective surface or mirror 42 is mounted inside the enclosure 12 on the back wall 14 and another reflective surface or mirror 44 is mounted outside the enclosure 12 on a forward extension 19 of the top wall 18. As seen in FIG. 2, the mirror 42 is disposed in a vertical plane while the mirror 44 is disposed at an acute angle (for example, 30°) thereto. When the lamps 38 are illuminated, light rays from the filaments 40 are projected rearwardly onto the mirror 42 and then forwardly through opening 29 in circuit board 28 onto the back of the liquid crystal display 32 as indicated by the arrows 46 in FIG. 2 thereby backlighting the liquid crystal display 32. At the same time, other light rays from the filaments 40 are projected forwardly through the window 24 onto the mirror 44 and then downwardly onto the front of the panel 22 as indicated by the arrows 48 in FIG. 2 to thereby frontlight any switch legends or other information on the panel 22. Some of the light rays indicated by the arrows 48 also pass through the window 26 and frontlight the liquid crystal display 32.

Figure 3:
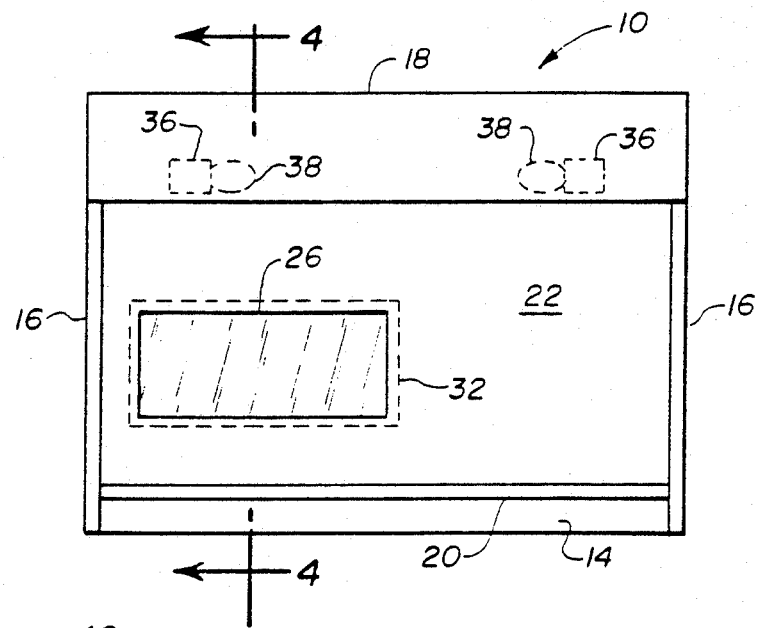
FIG. 3 is a front elevational view of a control panel according to another embodiment of the present invention.
Figure 4:
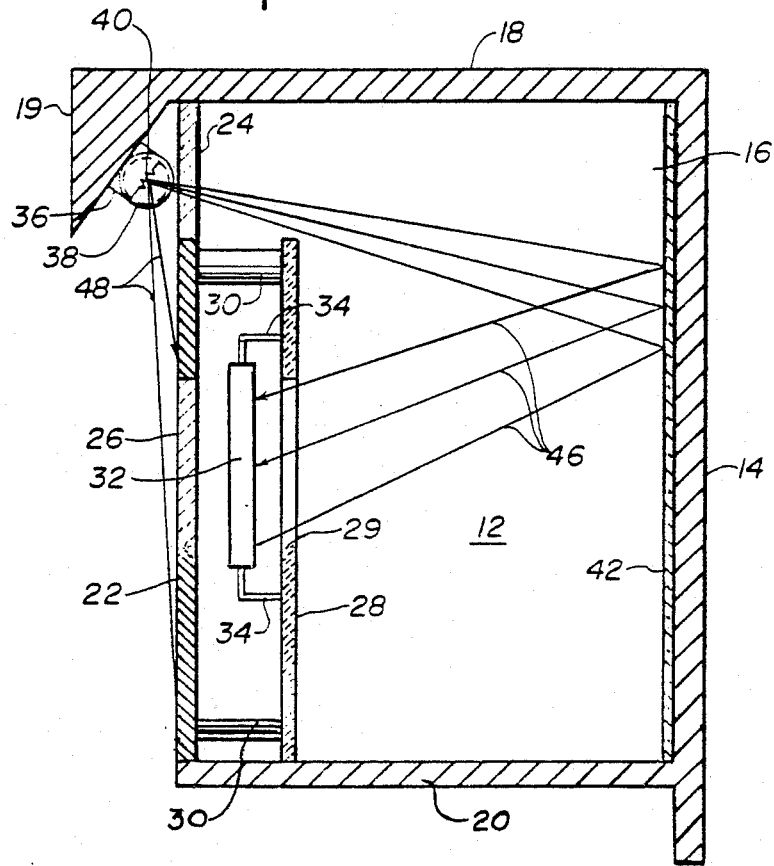
FIG. 4 is an enlarged cross-sectional view taken along lines 4—4 in FIG. 3.

In accordance with another embodiment of the present invention shown in FIGS. 3 and 4, the lamp sockets 36 and the lamps 38 are mounted outside the enclosure 12 on the forward extension 19 of the top wall 18, and the reflective surface or mirror 44 is omitted. Light rays from the filaments 40 of lamps 38 are projected rearwardly through the window 24 onto the mirror 42 and then forwardly onto the back of the liquid crystal display 32 as indicated by the arrows 46 in FIG. 4 while, simultaneously, other light rays from the filaments 40 are projected downwardly onto the front of panel 22 as indicated by the arrows 48 in FIG. 4.

The following claims are intended to cover all modifications and variations of the preferred embodiments disclosed herein without departing from the scope of the invention.

Having thus described the invention, what is claimed is:

1. An operator control panel comprising:
   an enclosure defined by a back wall, sidewalls, a top wall, a bottom wall, and a front panel;
   display means disposed inside said enclosure, said display means being viewable through a window in said front panel;
   lamp means disposed inside said enclosure;
   first reflective means located inside said enclosure rearwardly of said lamp means;
   second reflective means located outside said enclosure forwardly of said lamp means;
   said lamp means being positioned for projecting first light rays onto said first reflective means and then onto said display means and for projecting second light rays through another window in said front panel onto said second reflective means and then onto said front panel; and
   a circuit board disposed in said enclosure for supporting said display means, said lamp means being supported on said circuit board.

2. The operator control panel of claim 1, wherein said first reflective means comprises a first reflective surface on said back wall and wherein said second reflective means comprises a second reflective surface on a forward extension of said top wall.

3. The operator control panel of claim 2, wherein said second reflective surface is disposed at an acute angle to said first reflective surface.

4. The operator control panel of claim 1, wherein said display means comprises a liquid crystal display positioned such that said first light rays are projected onto the back thereof.

5. The operator control panel of claim 1, wherein said first light rays are projected rearwardly from said lamp means onto said first reflective means and then forwardly onto the back of said display means while said second light rays are projected forwardly from said lamp means onto said second reflective means and then downwardly onto the front of said front panel.

6. The operator control panel of claim 1, wherein said lamp means is of the type having a filament.

7. An operator control panel comprising:
   an enclosure defined by a back wall, sidewalls, a top wall, a bottom wall, and a front panel;
   display means disposed inside said enclosure, said display means beng viewable through a window in said front panel;
   lamp means disposed outside said enclosure;
   reflective means located inside said enclosure on said back wall rearwardly of said lamp means; and
   said lamp means being mounted on a forward extension of said top wall for projecting first light rays through another window in said front panel onto said reflective means and then onto said display means and for projecting second light rays onto said front panel.

8. The operator control panel of claim 7, wherein said display means comprises a liquid crystal display positioned such that said first light rays are projected onto the back thereof.

9. The operator control panel of claim 8, further comprising a circuit board disposed inside said enclosure for supporting said liquid crystal display.

10. The operator control panel of claim 7, wherein said first light rays are projected rearwardly from said lamp means onto said reflective means and then forwardly onto the back of said display means while said second light rays are projected downwardly from said lamp means onto the front of said front panel.

11. The operator control panel of claim 7, wherein said lamp means is of the type having a filament.

* * * * *